No. 863,072. PATENTED AUG. 13, 1907.
L. E. KNOTT.
APPARATUS FOR DETERMINING THE NUMBER OF VIBRATIONS PER SECOND
OF A TUNING FORK.
APPLICATION FILED APR. 1, 1907.
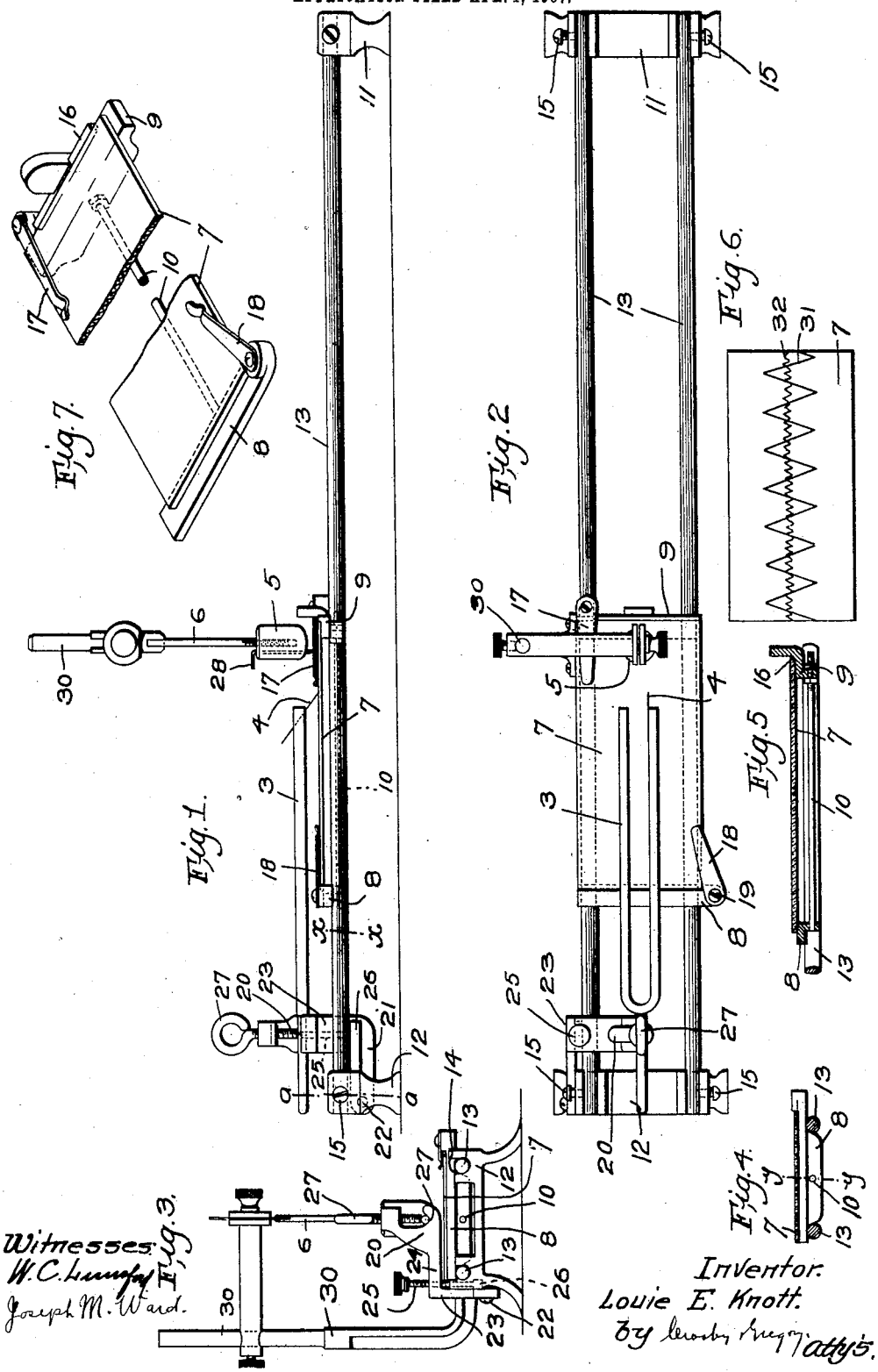
Witnesses
W. C. Lumpy
Joseph M. Ward.
Inventor
Louie E. Knott.
By Crosby Gregory
attys.

UNITED STATES PATENT OFFICE.

LOUIE E. KNOTT, OF BOSTON, MASSACHUSETTS, ASSIGNOR TO L. E. KNOTT APPARATUS COMPANY, OF BOSTON, MASSACHUSETTS, A CORPORATION OF MASSACHUSETTS.

APPARATUS FOR DETERMINING THE NUMBER OF VIBRATIONS PER SECOND OF A TUNING-FORK.

No. 863,072.    Specification of Letters Patent.    Patented Aug. 13, 1907.

Application filed April 1, 1907. Serial No. 365,659.

*To all whom it may concern:*

Be it known that I, LOUIE E. KNOTT, a citizen of the United States, residing in Boston, county of Suffolk, and State of Massachusetts, have invented an Improvement in Apparatus for Determining the Number of Vibrations Per Second of a Tuning-Fork, of which the following description, in connection with the accompanying drawing, is a specification, like letters on the drawing representing like parts.

This invention relates to an apparatus for determining the number of vibrations per second of a tuning fork. Devices for this purpose are commonly used in physical laboratories and other places, and they usually consist of a pendulum carrying a stylus, means to support a tuning fork which has a stylus or bristle secured to the end thereof, and means for movably sustaining a smoked glass in such a position that as the glass is moved past the pendulum and tuning fork, the stylus of the pendulum and the bristle of the tuning fork when each are set in vibration will each trace on the smoked glass a wavy line. The number of vibrations of the pendulum can easily be determined, and by comparing on the smoked glass the record of the vibrations of the tuning fork with that of the pendulum, the desired determination can be readily made.

The object of my invention is to improve devices of this character by making them adjustable so that they can readily accommodate tuning forks of a great variety of lengths, by simplifying and cheapening the construction thereof, by making a device which can be readily taken apart and packed in a small space for shipment or storage, and to otherwise improve generally these devices as will be more fully hereinafter described and then pointed out in the appended claims.

In the drawings wherein I have illustrated the preferred embodiment of my invention, Figure 1 is a side view thereof; Fig. 2 is a plan view; Fig. 3 is an end view; Fig. 4 is a section on the line $x—x$, Fig. 1; Fig. 5 is a section through the glass-sustaining slide on the line $y—y$, Fig. 4; Fig. 6 is a view of the glass showing thereon the record of vibrations of both the tuning fork and pendulum; Fig. 7 is a perspective view of the glass-sustaining slide.

3 is the tuning fork the vibrations of which are to be determined, it having the bristle or stylus 4 attached to one end thereof; 5 is the bob of the pendulum 6, and 7 is the smoked glass on which the vibrations are traced. These parts are such as are usually found in instruments of this class.

The glass 7 is sustained by a glass-sustaining slide of novel construction which comprises the two heads 8 and 9 that are connected by a rod 10, said heads being swiveled to the rod so that they may turn relative to each other. This slide is sustained by the frame which in this embodiment comprises the two standards 11 and 12 and the rods 13 connecting the standards. Each standard has on its upper side two open grooves 14 in which the rods are received, said rods being clamped in place by clamp screws 15.

The two heads 8 and 9 of the glass-sustaining slide each span the two rods 13 and rest thereon, said rods forming a way along which the slide may be moved while making the experiment. The head 9 is provided with the shoulder or flange 16 against which the end of the glass rests, and the head 8 has a flat upper surface on which the glass rests.

The glass is held in place by means of two spring clips 17 and 18, one pivoted to each of the heads so that it can be swung transversely. The spring clip 18 is pivoted to the head 8 at a point 19 outside the edge of the glass 7 so that a long piece of glass which extends clear beyond the head 8 may be used, as shown in Fig. 2.

By swiveling the two heads of the glass-sustaining slide a flexible slide is provided which will always have a firm bearing on the two rods 13, even though these rods do not stand absolutely in the same plane, said slide adapting itself to any irregularity in the ways or guide over which it slides, as will be obvious.

The standard 12 sustains a clamp 20 for holding the stem of the tuning fork 3. This clamp is adjustably mounted to the standard so that the end of the tuning fork may be adjusted vertically, thereby to bring the stylus or bristle into the proper position relative to the glass 7. For this purpose the clamp 20 is provided with an arm which is pivoted to the standard 12, as at 22. Said arm has the forwardly-extending part 21, the upwardly-extending part 23, and the laterally-extending portion 24, said laterally-extending portion overhanging the bed on which the glass rests. The arm is held in its adjusted position by an adjusting screw 25 which is screw-threaded through said arm and bears against a ledge or ear 26 rigid with the standard 12. By adjusting the screw 25, the arm may be turned about its pivot, thereby raising or lowering the end of the tuning fork, as will be obvious. The tuning fork is held in the clamp by means of any usual clamping screw 27. The pendulum is made vertically adjustable as usual so that it can be set at the right distance from the glass. The bob 5 is provided with an aperture through which extends the stylus 28 that is adapted to bear on the glass.

In order that the experiment may be accurately performed, it is important that the markings made on the smoked glass by the stylus 28 should cross those made on said glass by the bristle 4, and to insure that this will happen, I have made the bob 5 of the pendulum adjustable so that the stylus 28 may be adjusted transversely of the glass. One simple way of effecting this is by screw-threading the bob to the pendulum 6, for it will be noted from Fig. 1 that the stylus passes through the bob at one side of the pendulum 6 so that by turning the bob on the pendulum slightly the stylus will in its movement around the pendulum be carried transversely of the frame and thus the transverse adjustment of the stylus may be effected. By thus screw-threading the bob to the pendulum said bob may also be adjusted vertically to bring the stylus into the proper position relative to the glass.

By making the arm supporting the clamp 20 of the shape shown, that is, with the overhanging portion 24, said arm is out of the way of the glass and its carriage, so that the latter may be slid back completely under the arm. Furthermore this construction, as well as the construction of the carriage, permits the use of a very long glass 7 if it is desired to get a long record, that is, a glass that will be long enough to project considerably beyond the frame. The manner of making the frame is such that the standard 12 can be adjusted longitudinally of the rods 13, thus permitting said standard to be carried nearer to or farther from the standard 30 which supports the pendulum, according to the length of the tuning fork used. This adjustment provides for using tuning forks of any length.

In using the apparatus, the smoked glass 7 and its carriage are moved to the left, Fig. 1, and after the tuning fork and pendulum have been set in vibration, said carriage is given a quick movement to the right. As the glass passes under the pendulum and tuning fork, the stylus 28 and bristle 4 each trace a wavy line on the smoked glass, as seen in Fig. 6, the line 32 traced by the bristle 4, of course, having a greater number of undulations of less amplitude than the line 31 traced by the stylus 28. The number of vibrations per second of the pendulum can be easily determined and by comparing the number of undulations of the two lines in a given distance, the number of vibrations of the tuning fork per second can be readily ascertained.

It will be seen that my apparatus can be readily taken apart and packed for shipment or storage, owing to the manner of constructing the frame; that it is adapted for tuning forks of different lengths; that smoked glass of a variety of lengths may be used; and that it is capable of adjustment in a variety of ways, all of which makes it better adapted for its desired use than similar devices as heretofore made.

Having fully described my invention, what I claim as new and desire to secure by Letters Patent is:—

1. In a device of the class described, the combination with a frame, of a glass-sustaining carriage slidably mounted thereon, a pendulum marking device, and a tuning-fork holder pivoted to the frame and having a laterally-extending arm 24 situated above the frame whereby the glass-sustaining carriage may move under said arm.

2. In a device of the class described, the combination with a frame, of a glass-sustaining carriage slidably mounted thereon, a pendulum marking device, a tuning-fork holder pivoted to the frame and having a laterally-extending arm 24 situated above the frame whereby the glass-sustaining carriage may move under said arm, and means to adjust said arm thereby to raise or lower the end of the tuning fork carried thereby.

3. In a device of the class described, the combination with a frame comprising two standards and rods connecting them, of a glass-sustaining carriage slidably mounted on said rods, and a tuning-fork holder pivoted to one of the standards and having a laterally-extending arm 24 situated above the rods.

4. In a device of the class described, the combination with a frame comprising two standards and parallel rods connecting said standards, of a glass-sustaining slide slidably mounted on the rods, and a tuning-fork holder pivoted to one of the standards, said holder having a forwardly-extending portion 21 and a laterally-extending portion 24 situated above the rods.

5. In a device of the class described, the combination with a frame, comprising two standards and parallel rods connecting the said standards, of a glass-sustaining slide slidably mounted on said rods, and a tuning-fork holder pivoted to one of the standards, said holder comprising the forwardly-extending portion 21, the upwardly-extending portion 23 and the laterally-extending portion 24, the latter being situated above the rods.

6. In a device of the class described, the combination with a frame comprising two standards, rods connecting said standards, a pendulum sustained by one of said rods, a tuning-fork holder adjustably carried by one of the standards, and a glass-sustaining slide mounted on said rods, said latter standard being adjustable toward and from the pendulum support.

7. In a device of the class described, the combination with a frame of a glass-sustaining slide mounted thereon, a pendulum sustained above said slide, and a tuning-fork holder carried by the frame and shaped to permit of the slide passing under it.

8. In a device of the class described, the combination with a frame of a glass-sustaining slide movably mounted thereon, a pendulum, and means to sustain a tuning-fork above the frame while permitting the slide to pass under said means.

9. In a device of the class described, the combination with a frame comprising two rods, of a glass-sustaining slide carried thereby and comprising two heads flexibly connected together and each adapted to rest on both rods, a tuning-fork holder, and a pendulum.

10. In a device of the class described, the combination with a frame comprising two standards connected by two rods, of a glass-sustaining slide comprising two separated flexibly-connected heads resting on said rods, a tuning-fork holder and pendulum.

11. In a device of the class described, the combination with a frame comprising two parallel rods of a glass-sustaining slide comprising two flexibly connected separated heads extending transversely of the rod and resting thereon, a glass-holding clip pivoted to each head, a tuning-fork holder and a pendulum.

12. In a device of the class described, the combination with a frame, of a glass-sustaining slide thereon, a tuning-fork holder, a pendulum having a bob, and a stylus carried by the bob and adjustable transversely of the frame.

In testimony whereof, I have signed my name to this specification, in the presence of two subscribing witnesses.

LOUIE E. KNOTT.

Witnesses:
LOUIS C. SMITH,
BERTHA F. HEUSER.